United States Patent
Abe et al.

(10) Patent No.: US 11,989,550 B2
(45) Date of Patent: May 21, 2024

(54) CENTER DEVICE AND IN-VEHICLE ELECTRONIC CONTROL DEVICE

(71) Applicant: DENSO CORPORATION, Kariya (JP)

(72) Inventors: Masaaki Abe, Kariya (JP); Hideo Yoshimi, Kariya (JP)

(73) Assignee: DENSO CORPORATION, Kariya (JP)

( * ) Notice: Subject to any disclaimer, the term of this patent is extended or adjusted under 35 U.S.C. 154(b) by 101 days.

(21) Appl. No.: 17/723,520

(22) Filed: Apr. 19, 2022

(65) Prior Publication Data
US 2022/0342660 A1 Oct. 27, 2022

(30) Foreign Application Priority Data
Apr. 23, 2021 (JP) ................................. 2021-073377

(51) Int. Cl.
*G06F 8/658* (2018.01)
*B60W 50/00* (2006.01)
*G06F 21/64* (2013.01)

(52) U.S. Cl.
CPC ............ *G06F 8/658* (2018.02); *B60W 50/00* (2013.01); *G06F 21/64* (2013.01); *B60W 2050/0083* (2013.01)

(58) Field of Classification Search
CPC ........... B60W 2050/0083; B60W 50/00; G06F 21/64; G06F 8/658
See application file for complete search history.

(56) References Cited

U.S. PATENT DOCUMENTS

| | | |
|---|---|---|
| 2020/0050378 A1 | 2/2020 | Sakurai et al. |
| 2020/0050442 A1 | 2/2020 | Sakurai et al. |
| 2020/0183676 A1 | 6/2020 | Sakurai et al. |
| 2020/0241771 A1 | 7/2020 | Sakurai et al. |
| 2021/0155176 A1 | 5/2021 | Harata et al. |
| 2021/0157529 A1 | 5/2021 | Sakurai et al. |
| 2021/0157566 A1 | 5/2021 | Sakurai et al. |
| 2021/0157567 A1 | 5/2021 | Sakurai et al. |
| 2021/0157568 A1 | 5/2021 | Sakurai et al. |
| 2021/0157571 A1 | 5/2021 | Ogawa et al. |
| 2021/0157572 A1 | 5/2021 | Harata et al. |

(Continued)

FOREIGN PATENT DOCUMENTS

| | | | |
|---|---|---|---|
| JP | 2020-027624 A | 2/2020 | |
| WO | WO-2020032045 A1 * | 2/2020 | ......... B60R 16/0231 |

(Continued)

*Primary Examiner* — Phillip H Nguyen
(74) *Attorney, Agent, or Firm* — Harness, Dickey & Pierce, P.L.C.

(57) ABSTRACT

A center device includes a vehicle information storage unit, a hash value generation unit, and a package generation unit. The vehicle information storage unit stores identification information for electronic control devices mounted in a vehicle and information of software architecture of the electronic control devices together with a type of the vehicle. The hash value generation unit is configured to generate difference data, calculate a hash value of the difference data, and store the calculated hash value in a hash value storage unit, for each electronic control device that is an update target. The package generation unit is configured to generate distribution package for the update target using corresponding hash value stored in the hash value storage unit.

11 Claims, 11 Drawing Sheets

(56) References Cited

U.S. PATENT DOCUMENTS

2021/0157575 A1   5/2021   Ogawa et al.
2021/0157902 A1   5/2021   Sakurai et al.

FOREIGN PATENT DOCUMENTS

| WO | WO-2020032117 A1 * | 2/2020 | ............ B60W 20/10 |
| --- | --- | --- | --- |
| WO | WO-2020032122 A1 * | 2/2020 | ......... B60R 16/0231 |
| WO | WO-2020032197 A1 * | 2/2020 | ......... B60R 16/0231 |

* cited by examiner

FIG. 6

| ECU SW ID | ECU PROGRAM (FORMER) | ECU PROGRAM (NEW) | INTEGRITY VERIFICATION DATA FOR ECU PROGRAM (FORMER) | INTEGRITY VERIFICATION DATA FOR ECU PROGRAM (NEW) | UPDATE DATA (DIFFERENCE DATA) | INTEGRITY VERIFICATION DATA FOR UPDATE DATA | ROLLBACK DATA (DIFFERENCE DATA) | INTEGRITY VERIFICATION DATA FOR ROLLBACK DATA (DIFFERENCE DATA) | HASH VALUE |
|---|---|---|---|---|---|---|---|---|---|
| ads_002 | adsfile001 | adsfile002 | w1 | z1 | adsfile001-002 | x1 | adsfile002-001 | y1 | adsfile-hash |
| brk_005 | brkfile001 | brkfile005 | w2 | z2 | brkfile001-005 | x2 | brkfile005-001 | y2 | brkfile-hash |
| eps_011 | epsfile010 | epsfile011 | w3 | z3 | epsfile010-011 | x3 | epsfile011-010 | y3 | epsfile-hash |

204 ECU REPROGRAMMING DATA DB

FIG. 7

| VIN | VEHICLE MODEL | VEHICLE SW ID | DIGEST | SYS ID | ECU ID | ECU SW ID | ACTIVE BANK | ACCESS LOG | REPROGRAMMING STATUS |
|---|---|---|---|---|---|---|---|---|---|
| 1 | aaa | 0001 | xxxxxx | SA01_01 | ADS | aaa_ads_001 | — | 2018/12/10 07:05 | NONE |
|   |   |   |   | SA02_01 | ENG | aaa_eng_010 | BANK-A |   |   |
|   |   |   |   | SA02_01 | BRK | aaa_brk_001 | BANK-A |   |   |
|   |   |   |   | SA02_01 | EPS | aaa_eps_010 | BANK-A |   |   |
| 2 | aaa | 0002 | yyyyyy | SA01 | ADS | bbb_ads_002 | — | 2018/12/30 12:10 | ACTIVATED |
| 3 | bbb | 1001 | zzzzzz | SA01 | ADS | bbb_ads_001 | — | 2018/11/04 08:23 | DOWNLOADED |

213 INDIVIDUAL VEHICLE INFORMATION DB

FIG. 8

SPECIFICATION DATA

| ITEM | | VALUE (EXAMPLE) |
|---|---|---|
| REWRITE ENVIRONMENT | VEHICLE STATE | POSSIBLE DURING TRAVELLING (IG ON) / DURING PARKING (IG OFF) ONLY |
| | BATTERY LOAD (REMAINING CHARGE) | AT OR ABOVE 40% |
| | BUS LOAD TABLE | ALLOWABLE TRANSMISSION AMOUNT ACCORDING TO POWER SUPPLY STATE FOR EACH BUS |
| GROUP INFORMATION | FIRST GROUP INFORMATION | ECU(ID1)→ECU(ID2)→ECU(ID3) |
| | SECOND GROUP INFORMATION | ECU(ID4)→ECU(ID5)→ECU(ID6) |
| ECU (IDn) INFORMATION n = 1~6 | ECU ID | ECU ID |
| | CONNECTED BUS | FIRST BUS |
| | CONNECTED POWER SUPPLY | +B POWER, ACC POWER, IG POWER |
| | MEMORY TYPE | SINGLE-BANK MEMORY / PSEUDO-DOUBLE-BANK MEMORY / DOUBLE-BANK MEMORY |
| | REWRITE BANK INFORMATION | BANK-A: ACTIVE BANK, BANK-B: REWRITE BANK |
| | SECURITY ACCESS KEY INFORMATION | RANDOM NUMBER VALUE (KEY DERIVATION KEY) |
| | | KEY PATTERN |
| | | DECRYPTION OPERATION PATTERN |
| | REWRITE METHOD | SELF-RETENTION POWER / POWER SUPPLY CONTROL |
| | TRANSFER SIZE | 1Kbyte |
| | UPDATE PROGRAM VERSION | 2.0 |
| | UPDATE PROGRAM ADDRESS | 1 |
| | UPDATE PROGRAM SIZE | 10MKbyte |
| | ROLLBACK PROGRAM VERSION | 1.0 |
| | ROLLBACK PROGRAM ADDRESS | 0x80000 |
| | ROLLBACK PROGRAM SIZE | 10MKbyte |
| | WRITE DATA TYPE | DIFFERENCE DATA / ENTIRE DATA |
| | WRITE BANK | BANK-B |
| | UPDATE DATA | DATA FILE NAME |
| | HASH VALUE | HASH VALUE DATA FILE NAME |
| INDIVIDUAL VEHICLE INFORMATION | VIN | 123ABC123A1234567 |

CENTER DEVICE AND IN-VEHICLE ELECTRONIC CONTROL DEVICE

CROSS REFERENCE TO RELATED APPLICATION

This application is based on and incorporates herein by reference Japanese Patent Application No. 2021-073377 filed on Apr. 23, 2021.

TECHNICAL FIELD

The present disclosure relates to a center device configured to manage data written to electronic control devices mounted in a vehicle, and an in-vehicle electronic control device configured to communicate with the center device.

BACKGROUND

In recent years, with the diversification of vehicle control such as driving assist control and autonomous driving control, the scale of application programs such as vehicle control and diagnosis installed in electronic control units (ECUs) of the vehicle is increasing. In addition, with the version upgrade to improve functions, the opportunity to rewrite (reprogram) application programs of the ECUs is also increasing. On the other hand, with the development of communication network technologies, technologies related to connected cars are also developing. Under such circumstances, update programs for ECUs have been communicated through OTA (Over The Air) to rewrite programs of the ECUs at the vehicle.

SUMMARY

According to a first aspect of the present disclosure, a center device configured to manage data written to electronic control devices mounted in a vehicle includes a vehicle information storage unit, a hash value generation unit, and a package generation unit. The vehicle information storage unit stores identification information for each of the electronic control devices and information of software architecture of the each of the electronic control devices together with a type of the vehicle. The hash value generation unit is configured to, for the each of the electronic control devices that is an update target, generate difference data that is a difference between update data and the data before being updated, calculate a hash value of the difference data, and store the calculated hash value in a hash value storage unit. The package generation unit is configured to generate distribution package for the update target using corresponding hash value stored in the hash value storage unit.

According to a second aspect of the present disclosure, an in-vehicle electronic control device is configured to communicate with a center device, and includes at least one processor. The at least one processor is configured to request the center device to download difference data corresponding to a hash value when distribution package received by the in-vehicle electronic control device contains the hash value.

According to a third aspect of the present disclosure, a center device configured to manage data written to electronic control devices mounted in a vehicle includes a vehicle information storage unit, and at least one processor. The vehicle information storage unit stores identification information for each of the electronic control devices and information of software architecture of the each of the electronic control devices together with a type of the vehicle. The at least one processor is configured to, for the each of the electronic control devices that is an update target, generate difference data that is a difference between update data and the data before being updated, calculate a hash value of the difference data, and store the calculated hash value in a hash value storage unit. The at least one processor is further configured to generate distribution package for the update target using corresponding hash value stored in the hash value storage unit.

BRIEF DESCRIPTION OF THE DRAWINGS

The disclosure, together with additional objectives, features and advantages thereof, will be best understood from the following description, the appended claims and the accompanying drawings, in which:

FIG. 6 is a diagram illustrating an example of data registered in an ECU reprograming data DB;

FIG. 7 is a diagram illustrating an example of data registered in an individual vehicle information DB;

FIG. 8 is a diagram illustrating an example of specification data;

DETAILED DESCRIPTION

In order to rewrite the application program of a vehicle that is customized for each user, there is demand for the center device to generate a distribution package for rewriting for each vehicle.

However, a size of the distribution package may be about several gigabytes depending on the data size of the program that is a rewrite target, and it may take time to generate the distribution package. Therefore, it would take a huge amount of time to prepare delivery package for each vehicle, which may be difficult practically.

Figure 1:
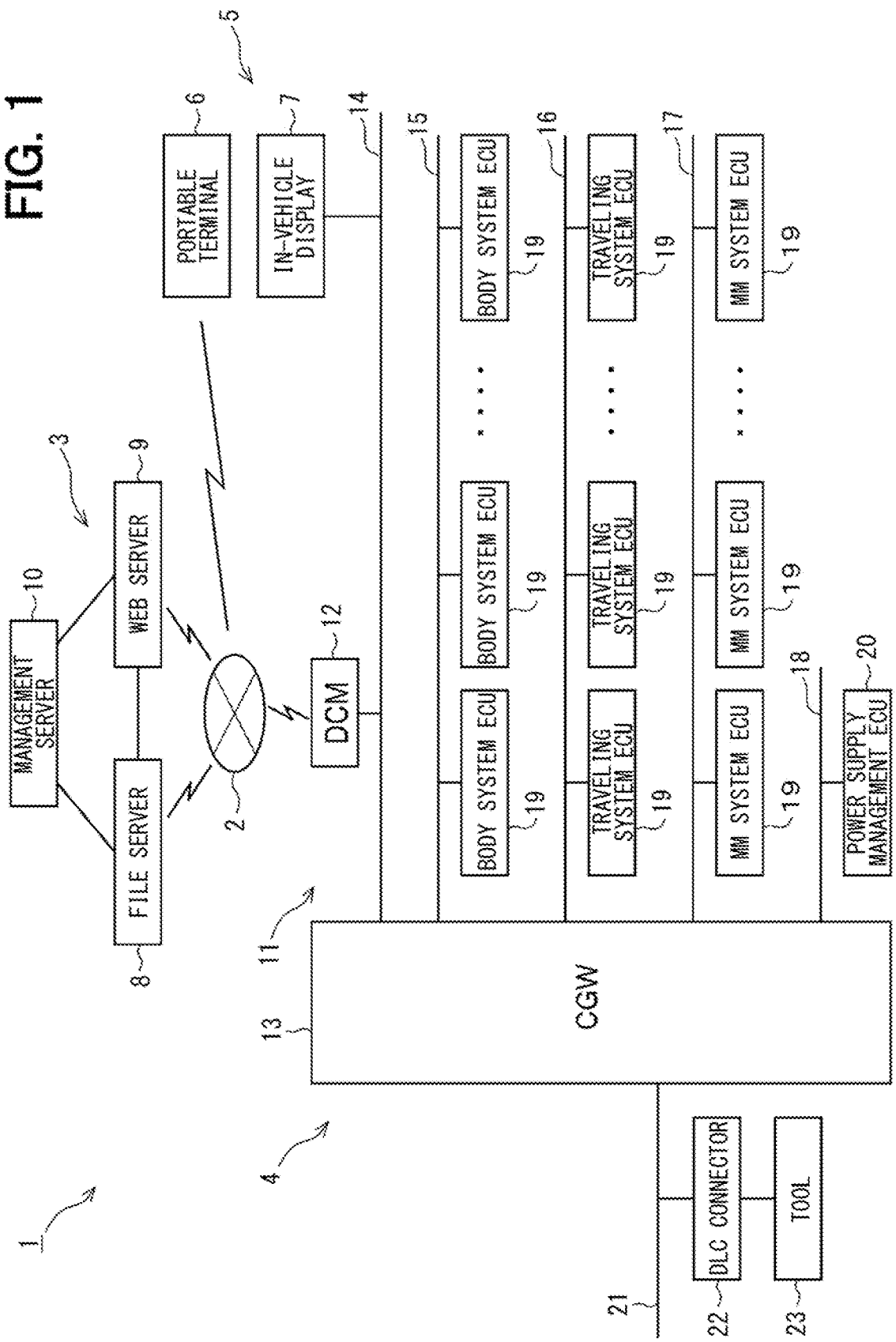
FIG. 1 is a functional block diagram illustrating a vehicle program rewriting system according to an embodiment.

Hereinafter, one embodiment of the present disclosure will be described with reference to the drawings. A vehicle program rewriting system is a system capable of rewriting an application program such as vehicle control and diagnosis of an ECU mounted in a vehicle through OTA. As illustrated in FIG. 1, a vehicle program rewriting system 1 includes a center device 3 on a communication network 2, a vehicle system 4 on a vehicle side, and a display terminal 5. The communication network 2 includes, for example, a mobile communication network using 4G network or the like, the Internet, WiFi (Wireless Fidelity) (registered trademark), and the like.

The display terminal 5 is a terminal having a function of receiving operation input by a user and a function of displaying various screens. The display terminal 5 is, for example, a portable terminal 6 such as a smartphone or a tablet computer that can be carried by the user, or an in-vehicle display 7 such as a display that is also used as a navigation function or a meter display disposed in a vehicle compartment. The portable terminal 6 can be connected to the communication network 2 as long as the portable terminal 6 is within a communication area of a mobile object communication network. The in-vehicle display 7 is connected to the vehicle system 4.

When the user is outside of the vehicle compartment and is within the communication area of the mobile object communication network, the user can perform input operation while checking various screens related to rewriting of an application program with the portable terminal 6, and can perform a procedure related to the rewriting of the application program. In the passenger compartment, the user can perform input operation while checking various screens related to rewriting of the application program on the in-vehicle display 7, and can perform a procedure related to rewriting of the application program. That is, the user can use the portable terminal 6 and the in-vehicle display 7 separately outside the passenger compartment and in the passenger compartment to perform a procedure related to rewriting of the application program.

The center device 3 entirely controls functions of the OTA on the communication network 2 in the vehicle program rewriting system 1, and therefore serves as an OTA center. The center device 3 includes a file server 8, a web server 9, and a management server 10, and each of the servers 8-10 is configured to perform data communication with each other.

The file server 8 has a function of managing an application program transmitted from the center device 3 to the vehicle system 4, and is a server that manages an ECU program provided from a supplier or the like that is a provider of the application program, information associated with the ECU program, specification data provided from an original equipment manufacturer (OEM), vehicle states acquired from the vehicle system 4, and the like. The file server 8 can perform data communication with the vehicle system 4 via the communication network 2, and transmits a distribution package in which the distribution specification data is packaged to the vehicle system 4 and the reprograming data which is also referred to as an update data when a download request for the distribution package is made. The web server 9 is a server that manages web information, and provides various screens related to rewriting an application program to the portable terminal 6. The management server 10 manages personal information of a user registered in a service of rewriting an application program, a rewrite history of an application program for each vehicle, and the like.

The center device 3 transmits the distribution package as a compressed file to the vehicle system 4, but transmits the reprograming data without compression. The reprograming data may be compressed outside the center device 3 or not be compressed, but the center device 3 does not compress the reprograming data received from the outside.

The vehicle system 4 has a master device 11. The master device 11 includes a data communication module (DCM) 12 and a central gateway (CGW) 13, and the DCM 12 and the CGW 13 are connected with each other through a first bus 14 to communicate with each other. The DCM 12 is an in-vehicle communication device that performs data communication with the center device 3 via the communication network 2, and, when a distribution package is downloaded from the file server 8, extracts write data from the distribution package, and transfers the write data to the CGW 13. Alternatively, when the DCM 12 downloads the distribution package from the file server 8, the DCM 12 transfers the distribution package to the CGW 13. The CGW 13 extracts the write data from the distribution package.

The CGW 13 is a vehicle gateway device having a data relay function, and, when the write data is acquired from the DCM 12, distributes the write data to a rewrite target ECU in which an application program is to be rewritten. The master device 11 controls the OTA function of the vehicle side in the vehicle program rewriting system 1, and functions as an OTA master. In FIG. 1, a configuration in which the DCM 12 and the in-vehicle display 7 are connected to the same first bus 14 is illustrated as an example, but the DCM 12 and the in-vehicle display 7 may be connected to different buses. The CGW 13 corresponds to a relay device of the present disclosure.

In addition to the first bus 14, a second bus 15, a third bus 16, a fourth bus 17, and a fifth bus 18 are connected to the CGW 13 as vehicle inside buses, and various types of ECUs 19 are connected to the CGW 13 through the buses 15 to 17. Furthermore, a power supply management ECU 20 is connected to the CGW 13 through the fifth bus 18.

The second bus 15 is, for example, a body-system network bus. The ECUs 19 connected to the second bus 15 include, for example, a door ECU for controlling locking/unlocking of doors, a meter ECU for controlling a meter display, an air conditioning ECU for controlling an air conditioner, a window ECU for controlling opening/closing of windows. The third bus 16 is, for example, a driving-system network bus. The ECUs 19 connected to the third bus 16 is ECUs controlling the traveling system and include, for example, an engine ECU controlling driving of an engine, a brake ECU controlling driving of a brake, an electronic controlled transmission (ECT) ECU controlling driving of an automatic transmission, and a power steering ECU controlling a driving of a power steering.

The fourth bus 17 is, for example, a multimedia-system (MM system) network bus. The ECUs 19 connected to the fourth bus 17 include, for example, a navigation ECU for controlling a navigation system, an ETC for controlling an electronic toll collection system (ETC: electronic toll collection system (a registered trademark)). The buses 15 to 17 may be system buses other than the body system network bus, the traveling system network bus, and the multimedia system network bus. The number of the buses and the ECUs 19 are not limited to the number described above. The power supply management ECU 20 is an ECU having a function of managing power to be supplied to the DCM 12, the CGW 13, the various ECUs 19, and the like.

A sixth bus 21 is connected to the CGW 13 as a bus outside the vehicle. A data link coupler (DLC) connector 22 to which a tool 23 is detachably connected is connected to the sixth bus 21. The buses 14 to 18 inside the vehicle and the bus 21 outside the vehicle are configured with, for example, Controller Area Network (CAN) (registered trademark) buses, and the CGW 13 performs data communication with the DCM 12, the various ECUs 19, and the tool 23 in accordance with the CAN data communication standard and the diagnosis communication standard (UDS: ISO14229). The DCM 12 and the CGW 13 may be connected to each other via Ethernet, and the DLC connector 22 and the CGW 13 may be connected to each other via Ethernet.

When write data is received from the CGW 13, the rewrite target ECU 19 writes the write data to a flash memory to rewrite an application program. In the above configuration, when a request for acquiring write data is received from the rewrite target ECU 19, the CGW 13 functions as a reprograming master that transmits the write data to the rewrite target ECU 19. When the write data is received from the CGW 13, the rewrite target ECU 19 functions as a reprograming slave that writes the write data to the flash memory to rewrite the application program. The rewrite target ECU may be referred to as a target ECU.

As an aspect of rewriting the application program, there are a wired rewrite aspect and a wireless rewrite aspect. In the aspect in which the application program is rewritten in a wired manner, when the tool 23 is connected to the DLC connector 22, the tool 23 transfers the write data to the CGW 13. The CGW 13 relays or distributes the write data transferred from the tool 23 to the rewrite target ECU 19. In the aspect of rewriting the application program in a wireless manner, as described above, when the distribution package is downloaded from the file server 8, the DCM 12 extracts the write data from the distribution package, and transfers the write data to the CGW 13.

Figure 2:
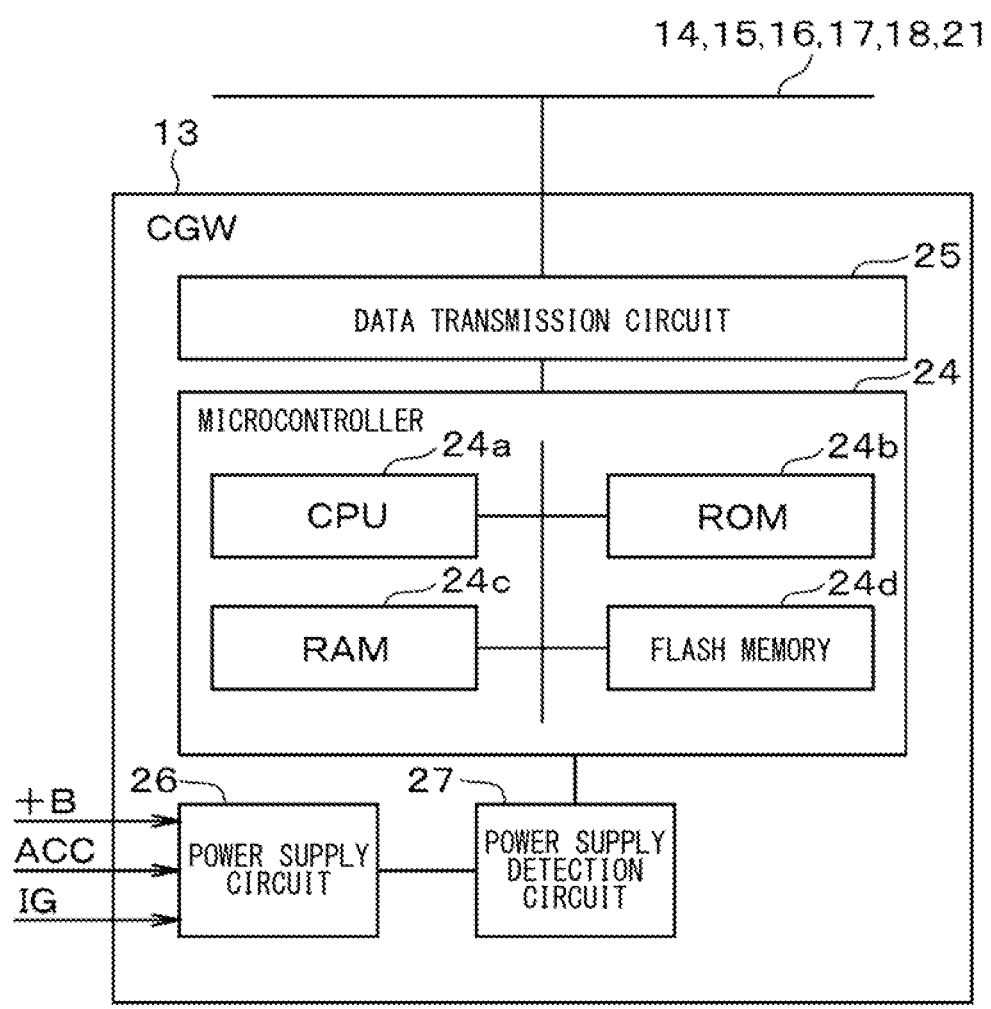
FIG. 2 is a functional block diagram of the CGW.

As shown in FIG. 2, the CGW 13 includes, as electrically functional blocks, a microcomputer 24, a data transmission circuit 25, a power supply circuit 26, and a power supply detection circuit 27. The microcomputer 24 includes a CPU (Central Processing Unit) 24a, a ROM (Read Only Memory) 24b, a RAM (Random Access Memory) 24c, and a flash memory 24d. The microcomputer 24 executes various control programs stored in a non-transitional tangible storage medium to perform various types of processing, thereby controlling the operation of the CGW 13.

The data transmission circuit 25 controls data communication with the buses 14 to 18 and 21 in accordance with CAN data communication standards and diagnostic communication standards. The power supply circuit 26 inputs a battery power supply (hereinafter referred to as +B power supply), an accessory power supply (hereinafter referred to as an ACC power supply), and an ignition power supply (hereinafter referred to as an IG power supply). The power supply detection circuit 27 detects a voltage value of the +B power supply, a voltage value of the ACC power supply, and a voltage value of the IG power supply input by the power supply circuit 26, compares these detected voltage values with a predetermined voltage threshold, and outputs comparison results to the microcomputer 24. The microcomputer 24 determines whether the +B power supply, the ACC power supply, and the IG power supply that are externally supplied to the CGW 13 are normal or abnormal based on the comparison results input from the power supply detection circuit 27.

Figure 3:
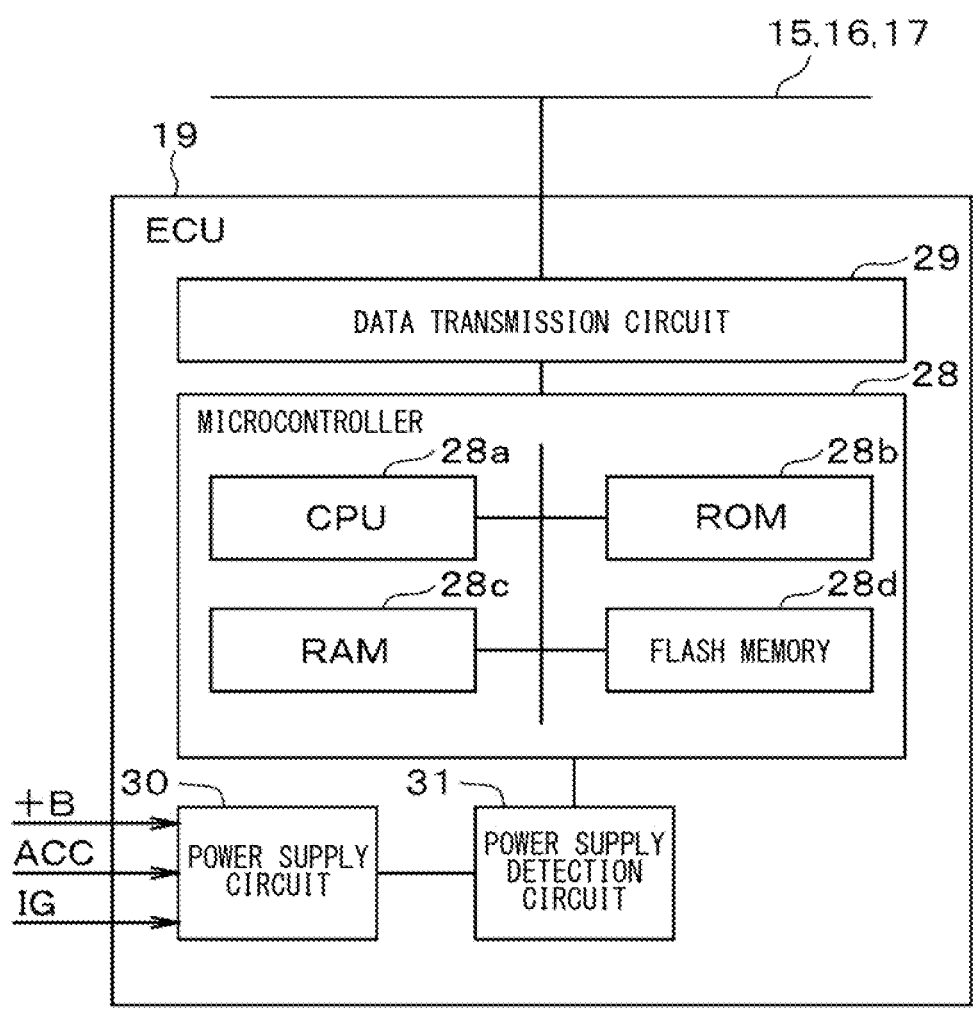
FIG. 3 is a functional block diagram showing a configuration of an ECU.

As shown in FIG. 3, each of the ECUs 19 includes, as electrically functional blocks, a microcomputer 28, a data transmission circuit 29, a power supply circuit 30, and a power supply detection circuit 31. The microcomputer 28 includes a CPU 28a, a ROM 28b, a RAM 28c, and a flash memory 28d. The microcomputer 28 executes control programs stored in a non-transitional tangible storage medium to perform various types of processing, thereby controlling the operation of the ECUs 19.

The data transmission circuit 29 controls data communication with the buses 15 to 17 in accordance with CAN data communication standards. The power supply circuit 30 inputs the +B power supply, the ACC power supply, and the IG power supply. The power supply detection circuit 31 detects a voltage value of the +B power supply, a voltage value of the ACC power supply, and a voltage value of the IG power supply input by the power supply circuit 30, compares these detected voltage values with a predetermined voltage threshold, and outputs comparison results to the microcomputer 28. The microcomputer 28 determines whether the +B power supply, the ACC power supply, and the IG power supply that are externally supplied to the ECUs 19 are normal or abnormal based on the comparison results input from the power supply detection circuit 27. The ECUs 19 fundamentally have the same configuration except that loads such as sensors or actuators connected thereto are different from each other. A fundamental configuration of each of the DCM 12, the in-vehicle display 7, and the power supply management ECUs is the same as that of the ECU 19 illustrated in FIG. 3.

Figure 4:
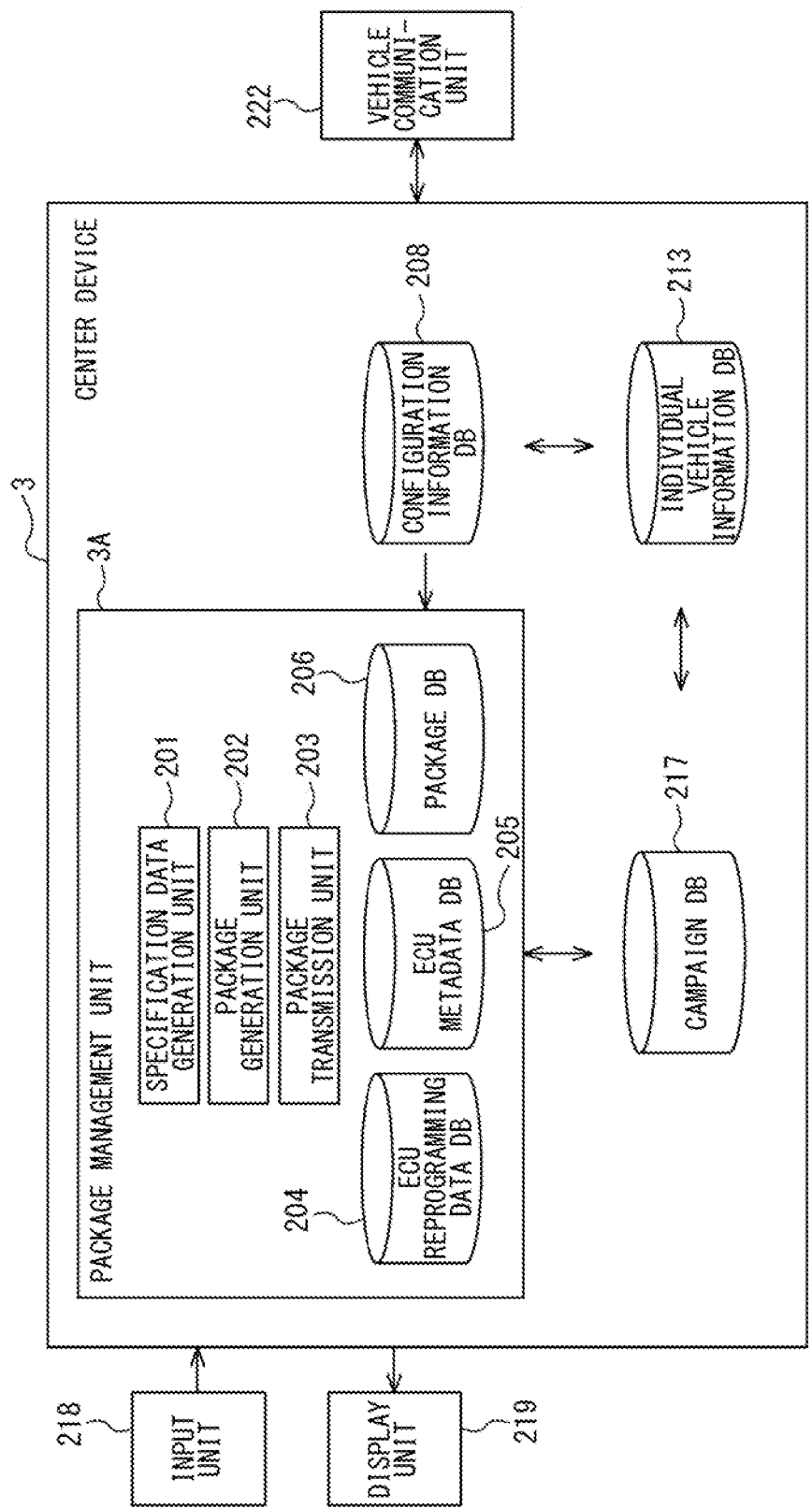
FIG. 4 is a functional block diagram illustrating a configuration of a center device.

As shown in FIG. 4, the center device 3 includes a package management unit 3A. The package management unit 3A includes a specification data generation unit 201, a package generation unit 202, a package transmission unit 203, an ECU reprograming data DB 204, an ECU metadata DB 205, and a package DB 206.

The supplier registers ECU individual data using an input unit 218 and a display unit 219 that are user interface (UI) functions of the management server 10. The ECU individual data includes a program file such as a new program or difference data, verification data or a size of the program file, program file related information such as encryption methods, and ECU attribute information such as a memory structure of the ECU 19. The program file is stored in the ECU reprograming data DB 204. The ECU attribute information is stored in the ECU metadata DB 205. The program file related information may be stored in the ECU reprograming data DB 204 or may be stored in the ECU metadata DB 205.

The OEM registers approved configuration information in the configuration information DB 208 for each vehicle model. The approved configuration information is configuration information of a vehicle approved by a public organization. The configuration information is identification information regarding hardware and software of the ECU 19 mounted in a vehicle, and is an example of vehicle related information. The configuration information includes identification information of a system configuration formed of a plurality of ECUs 19 and identification information of a vehicle configuration formed of a plurality of systems. As the configuration information, vehicle restriction information related to program update may be registered. For example, group information of the ECUs described in the rewrite specification data, a bus load table, and information regarding a battery load may be registered.

The specification data generation unit 201 refers to each DB and generates rewrite specification data. The package generation unit 202 generates a distribution package including rewrite specification data and difference data, and registers the distribution package in the package DB 206. An ID of a distribution package, a distribution package file, and data for verifying the integrity of the distribution package are registered in the package DB 206. The package generation unit 202 may generate a distribution package including the distribution specification data. The package transmission unit 203 distributes the registered distribution package and the registered reprograming data to the vehicle system 4. The package transmission unit 203 corresponds to a distribution unit.

The individual vehicle information uploaded from individual vehicles is registered in the individual vehicle information DB 213. The individual vehicle information at the time of production or sale may be registered as the initial value before the individual vehicle information is uploaded. The configuration information for each vehicle model is registered in the configuration information DB 208.

The OEM registers campaign information related to the program update and distributed to the vehicle in the campaign DB 217. The campaign information corresponds to the "distribution specification data" described above, and is information regarding an update content displayed on the vehicle system 4. In the vehicle system 4, for example, the user determines whether to download the update program on the basis of the campaign information transmitted from the center device 3, and downloads the update program if necessary. The portions of the management unit 3A except the databases are functions realized by computer hardware and software. The vehicle communication unit 222 is a functional block for performing data communication between the center device 3 and the vehicle system 4 in a wireless manner.

Figure 5:
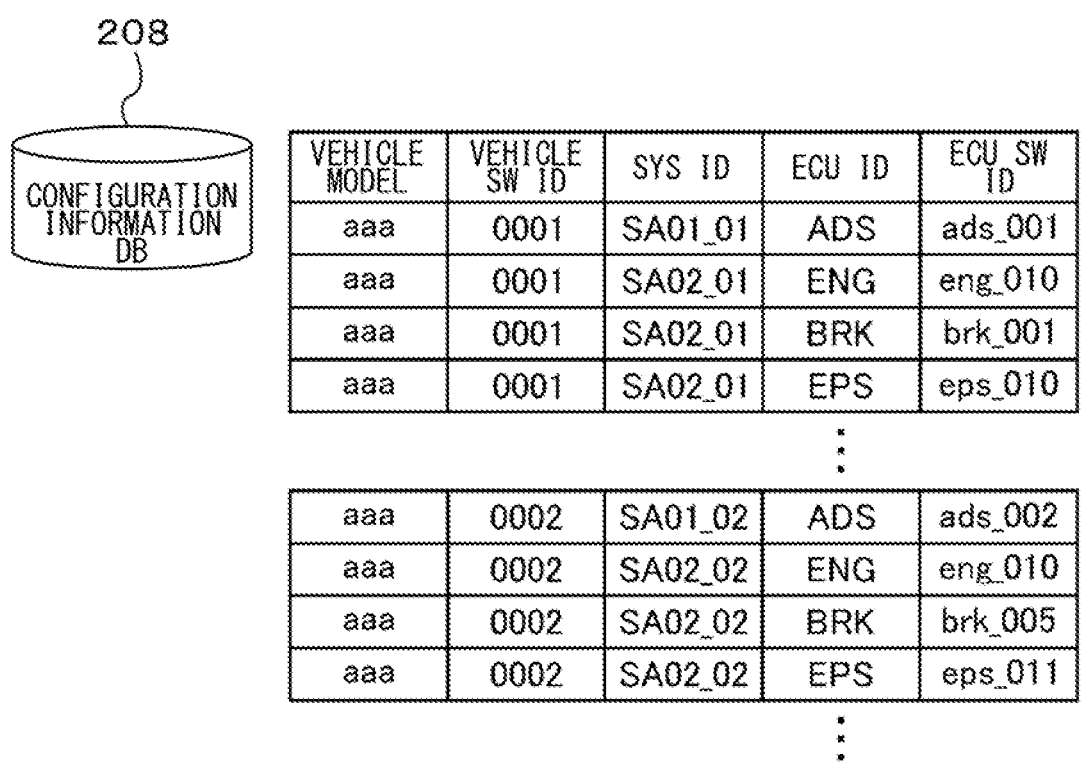
FIG. 5 is a diagram illustrating an example of data registered in a configuration information DB.

Hereinafter, the above process will be described in more detail. Contents of data registered in each database will be described first. As illustrated in FIG. 5, as an example, the following data is registered in the configuration information DB 208. A "vehicle model" indicates the model of a vehicle. A "Vehicle SW ID" is a software ID for the entire vehicle, and corresponds to a vehicle software ID. Only one "Vehicle SW ID" is given to each vehicle, and is updated as versions of application programs of any one or more of the ECUs are updated. A "Sys ID" is an ID of a system when a group of the ECUs 19 mounted in each vehicle is referred to as a system.

For example, in FIG. 1, a group of the body system ECUs 19 is a body system, and a group of the traveling system ECUs 19 is a traveling system. The "Sys ID" is updated as versions of application programs of any one or more ECUs forming a system are updated. An "ECU ID" is an ID for identifying a device, indicating the type of ECU. An "ECU SW ID" is a software ID for each ECU and corresponds to an ECU software ID. For the sake of convenience, the "ECU ID" is illustrated to be added with a version of software. The "ECU SW ID" is updated as a version of an application program of a corresponding ECU is updated. Even if the same program version is used in the same "ECU ID", different "ECU SW IDs" are used when hardware configurations are different from each other. That is, the "ECU SW ID" is also information indicating a product number of the ECU.

FIG. 5 illustrates the configuration information regarding a vehicle having the vehicle model of "aaa". Among the ECUs 19 mounted in a vehicle, an autonomous driving ECU (ADS), an engine ECU (ENG), a brake ECU (BRK), and an electric power steering ECU (EPS) are exemplified. For example, "ECU SW IDs" of "Vehicle SW ID"="0001" are "ads_001", "eng_010", "brk_001", and "eps_010", whereas "ECU SW IDs" of "Vehicle SW ID"="0002" is "ads_002", "eng_010", "brk_005", and "eps_011", and three software versions are updated. As a result, "Sys ID"="SA01" is updated to "SA02", and "Sys ID"="SA02" is updated to "SA03". As mentioned above, the initial value is registered in the configuration information DB 208 at the time of production or sales of the vehicle, and then is updated as versions of application programs of any one or more ECUs is updated. That is, the configuration information DB 208 indicates approved configuration information of each vehicle model that is present in the market.

As illustrated in FIG. 6, as an example, the following programs and data are registered in the ECU reprograming data DB 204. In FIG. 6, among the ECUs 19 mounted in a certain vehicle model, as ECUs 19 in which application programs are updated, an autonomous driving ECU (ADS), a brake ECU (BRK), and an electric power steering ECU (EPS) are exemplified. With respect to the latest "ECU SW ID" of the update target ECU 19, old program and new program files for the ECU 19, the integrity verification data for the new program, an update data file that is difference data between the new program and the old program, integrity verification data for the update data, a rollback data file that is the difference data, integrity verification data of the rollback data, a hash value obtained by applying a hash function to the update data file, and a hash value obtained by applying a hash function to the rollback data file are registered.

In the present embodiment, the rewriting from the old program to the new program is performed using the difference data. However, the update data may be entire data corresponding to entire new application program instead of the difference data. The rollback is the process of writing back from the new program to the old program when an error or cancellation occurs while updating the program.

Although a data structure of the latest "ECU SW ID" is illustrated in FIG. 6, in a case where data of the old "ECU SW ID" is stored, a new program file with the previous "ECU SW ID" may be referred for the old program file. Each piece of the registered integrity verification data and the hash values may be calculated by the supplier or the center device 3.

For example, the following specification data of each ECU is registered in the ECU metadata DB 205. For the latest "ECU SW ID", a size of an update data file, a size of a rollback data file, bank information indicating a bank related to a program among a bank-A, a bank-B, a bank-C, and the like in a case where the flash memory 28d included in the ECU 19 has two or more banks, a transfer size, a read address of a program file, and the like are registered. These are examples of update data related information. Detailed contents of the specification data will be described later.

Attribute information indicating an attribute of the ECU 19 is also registered in the ECU metadata DB 205. The attribute information is information indicating a hardware attribute and a software attribute of the ECU. The "transfer size" is a size of divided data when rewrite data is divided and transferred from the CGW 13 to the ECU 19, and the "key" is a key used when the CGW 13 securely accesses the ECU 19. These are examples of software attribute information. The "vehicle model" and "ECU ID" also include a memory configuration of the flash memory 28d of the ECU 19, the type of the bus to which the ECU 19 is connected, the type of the power supply connected to the ECU 19, and the like. These are examples of hardware attribute information.

Here, in the memory configuration, a "single-bank" is a single-bank memory having a single flash bank, a "double-bank" is a double-bank memory having double flash banks, and "suspend" is a single-bank suspend memory having a pseudo-double flash banks. The hardware attribute information and the software attribute information are information used for rewrite control of each ECU 19 in the vehicle system 4. The software attribute information is data that directly designates a rewrite operation of each ECU 19.

As illustrated in FIG. 7, as an example, the following data for each individual vehicle is registered in the individual vehicle information DB 213. Generally, configuration information of each vehicle and status information of each vehicle with respect to program update is registered. Specifically, the configuration information such as "Vehicle SW ID", "Sys ID", "ECU ID", and "ECU WE ID" is registered for a "VIN" (Vehicle Identification Number) that is a vehicle identification number and is an ID of each vehicle. A "Digest" value that is a hash value of the configuration information is also calculated by and stored in the center device 3. An "active bank" is a bank where a program currently operated by the ECU 19 is written in a case where a memory configuration is a double-bank, and an uploaded value is registered along with the configuration information.

An "access log" is the date and time when the vehicle uploaded the individual vehicle information to the center device 3. A "reprograming status" indicates a status of reprograming in the vehicle, and includes, for example, "campaign issued", "activated", and "downloaded". That is, this progress status indicates to which phase the reprograming in the vehicle has advanced and in which phase the reprograming is delayed. When the configuration information or the like is uploaded from the vehicle system 4 to the center device 3, the "VIN" of each vehicle is added to the information or the like.

The following data is registered in the campaign DB 217. The data is an ID of campaign information, a distribution package ID, message information such as text statements indicating a concrete update content as a campaign content, a list of "VINs" which are IDs of campaign target vehicles, a list of "Vehicle SW IDs" before and after the update, a list of "ECU SW IDs" before and after the update, and the like. A "target VIN" list may be registered by collating the individual vehicle information DB 213 with the campaign DB 217. The campaign information may also be registered in the package DB 206.

The specification data generation unit 201 accesses the ECU metadata DB 205, and acquires the update data related information, the hardware attribute information, the software attribute information, and the individual vehicle information as the specification data regarding the update target ECU 19. For example, as illustrated in FIG. 8, the update data related information includes an "update program version", an "update program acquisition address", an "update program size", a "rollback program version", a "rollback program acquisition address", a "rollback program size", a "write data type", a "write bank", an "update data", and a "hash value".

The hardware attribute information includes a "connection bus", a "connected power supply", and a "memory type". The software attribute information includes "rewrite bank information", "security access key information", a "rewrite method", and a "transfer size". The "rewrite method" is data indicating whether rewriting is performed by enabling the self-retention power circuit when switching occurs from IG-on to IG-off (self-retention power), or the rewriting is performed according to IG-on and IG-off (power supply control). Information other than a key may be included as the "security access key information".

The individual vehicle information is the above-described "VIN". The "VIN" is unique information, i.e. the vehicle identification information, for identifying a vehicle to which the distribution package is to be transmitted. The vehicle identification information may be a vehicle number or a vehicle registration number instead of the "VIN", for example. The individual vehicle information may contain an owner information of the vehicle.

Hereinafter, each piece of information will be described. The "Write data type" is a type indicating whether a program is difference data or the entire data. The write data type of an update program and the write data type of a rollback program may be described separately. The "write bank" is information indicating a bank in which a program is written for the double-bank memory ECU 19. The "connection bus" is information for identifying a bus to which the ECU 19 is connected. The "connection power supply" is information indicating a state of a power supply to which the ECU 19 is connected, in which a value indicating any of the battery power (+B power supply), the accessory power (ACC power supply), and the ignition power (IG power supply) is described.

The "memory type" is information for identifying a memory configuration of the ECU 19, in which a value indicating any of a double-bank memory, a single-bank suspend memory (pseudo-double-bank memory), a single-bank memory, and the like is described. The "rewrite bank information" is information indicating which bank of the ECU 19 is a start bank (active bank) and which bank is a rewrite bank (inactive bank). The "security access key information" is information for authenticating access to the ECU 19 using a key, and includes information such as a key derivation key, a key pattern, and a decryption operation pattern. The "transfer size" is a data size when a program is divided and transferred to the ECU 19. The "update data" is a file name of the update data file that is the difference data. The "hash value" is a file name of the data file of the hash value of the update data file. The "hash value" is associated with the difference data. That is, the specification data includes the file name of the update data file and the data file name of the hash value, and accordingly the difference data and the hash value are associated with each other. The vehicle system 4 that received the specification data grasps, by referring the specification data, that which hash value corresponds to which difference data.

For example, as illustrated in FIG. 8, the "ECU ID" is used as a key to store these pieces of information in the specific ECU order described above. When information regarding all the ECUs is acquired, the specification data generation unit 201 designates "rewrite environment information" for an update target vehicle. The "rewrite environment information" is information used for rewrite control in the vehicle system 4 for the group of ECUs or the entire vehicle, and is data directly designating a rewrite operation. For example, the rewrite environment information for the entire vehicle includes a "vehicle state" indicating whether program update in the vehicle system 4 is performed while the vehicle is traveling (while the IG switch is turned on) or while the vehicle is parked (while the IG switch is turned off), a "battery load (a remaining battery charge)" indicating a restriction on the remaining battery charge for executing the program update in the vehicle system 4, bus load table information indicating a restriction on a bus load for transferring write data in the vehicle system 4, and the like.

The rewrite environment information for the group includes the ECUs 19 belonging to the group, the order of ECUs in the group, and the like. In the vehicle system 4, program update is controlled to be synchronized in the group unit, and writing into the ECU 19 is executed in the designated ECU order. The specification data generation unit 201 starts a screen for registering rewrite environment information, and receives input from the operator of the OEM. Alternatively, Excel (registered trademark) file in which rewrite environment information is written may be imported. Alternatively, the restriction information registered in the configuration information DB 208 may be extracted.

The bus load table is a table illustrating a correspondence relationship between a power supply state and an allowable transmission amount for a bus. The allowable transmission amount is a sum of a transmission amount of vehicle control data and write data that can be transmitted with respect to the maximum allowable transmission amount. For example, when the allowable transmission amount is "80%" of the maximum allowable transmission amount for the first bus, in the IG power supply state, the CGW 13 allows "50%" of the maximum allowable transmission amount as an allowable transmission amount of vehicle control data and "30%" of the maximum allowable transmission amount as an allowable transmission amount of write data. In the ACC power supply state, the CGW 13 allows "30%" of the maximum allowable transmission amount as an allowable transmission amount of the vehicle control data and "50%" of the maximum allowable transmission amount as an allowable transmission amount of the write data. In the +B power supply state, the CGW 13 allows "20%" of the maximum allowable transmission amount as an allowable transmission amount of the vehicle control data, and allows "60%" of the maximum allowable transmission amount as an allowable transmission amount of the write data. The same applies to the second bus and the third bus.

Finally, the specification data generation unit 201 locates each piece of the generated or acquired data in accordance with a predetermined data structure, and thus generates rewrite specification data as illustrated in FIG. 8. That is, the specification data generation unit 201 generates the rewrite specification data in a data structure that can be analyzed by the vehicle system 4. Each piece of ECU information may be described in the rewrite specification data in the order of younger group and in accordance with the order of ECUs in the group. For example, in a case where the group 1 is set to the "ADS", the first of the group 2 is set to the "BRK", and the second of the group 2 is set to the "EPS", ECU information of the "ADS" is arranged first, ECU information of the "BRK" is arranged next, and ECU information of the "EPS" is arranged last in the ECU information field of the specification data.

In the specification data illustrated in FIG. 8, the "ECU ID" to the "transfer size" of the ECU information are examples of the target device related information including the type of the target ECU 19, and correspond to the above-described hardware attribute information and software attribute information. The "update program version" to the "hash value" are examples of update data related information. The "rewrite environment" for the group of ECUs or the entire vehicle is an example of update process information for designating an update process in a vehicle.

Figure 9:
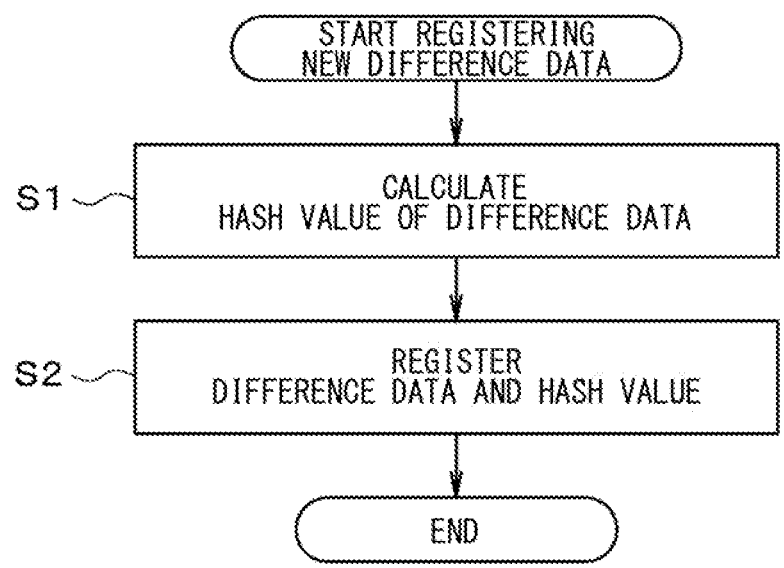
FIG. 9 is a flowchart illustrating a registration process for new difference data.

Next, operation of the present embodiment is described. As shown in FIG. 9, in order to register new difference data, the specification data generation unit 201 calculates the hash value of the difference data (S1) and registers the difference data and the calculated hash value to the ECU reprograming data DB 204 (S2). The ECU reprograming data DB 204 corresponds to a hash value storage unit.

Figure 10:
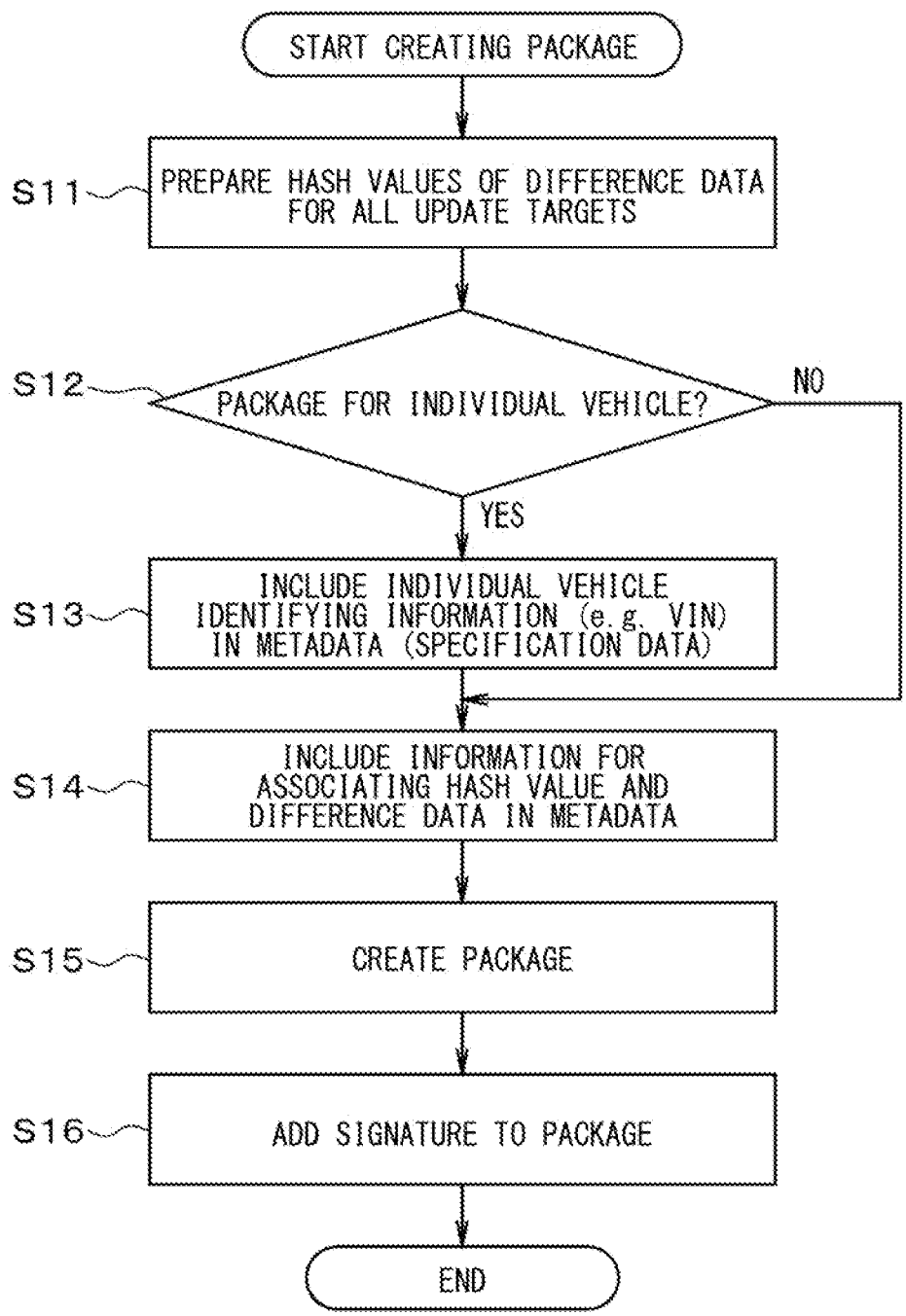
FIG. 10 is a flowchart showing a packaged data generation process.

As shown in FIG. 10, the package generation unit 202 acquires (prepares) the hash value corresponding to the difference data for all data of the update target from the ECU reprograming data DB 204 (S11). When there are multiple pieces of the difference data for the update target, the hash value is generated for each pieces of difference data, and multiple hash values are generated. Subsequently, it is determined whether there is an update by new program, i.e. the campaign information, by referring the configuration information DB 208 and the individual vehicle information DB 213. The package generation unit 202 determines whether an individual vehicle package generation condition is satisfied (S12). When it is determined that the individual vehicle package generation condition is satisfied (YES), the process proceeds to step S13. When it is determined that the individual vehicle package generation condition is not satisfied (NO), the process proceeds to step S14.

The individual vehicle package generation condition is, for example, that the update data is paid for, that is, that the update data is a billing package. When the update data is paid for, the individual vehicle package generation condition is satisfied. According to this configuration, the application of the update package can be limited to the vehicle of the user who has contracted for the paid service. The individual vehicle package generation condition may be a flag indicating the necessity of the individual vehicle package. For example, an operator sets the flag according to the type of the ECU to be updated or the type of the update data. Moreover, S12 may be omitted, and the individual identification information may always be contained in the specification data of the distribution package.

The package containing the specification data including the vehicle identification information is referred to as an individual vehicle package, and the package containing the specification data that does not including the vehicle identification information may be referred to as a general-purpose package. Since the individual vehicle package is used by the vehicle identified by the specification data of the individual vehicle package, it can be prevented from being used for updating the program of other vehicles, and accordingly the individual vehicle package can support the customized ECU settings. In contrast, the general-purpose package is widely applied to the vehicles of predetermined models. Since one general-purpose package can be applied to multiple vehicles, the processing load required for generating the distribution package by the center device 3 can be reduced.

When the distribution package is the individual vehicle package, the "VIN" that is the vehicle identification information is included in the specification data (S13), and information for associating the hash value with the difference data, that is, the file names of the hash value and the difference data are included in the specification data (S14). When the distribution package is not the individual vehicle package (S12: NO), step S13 is skipped, and step S14 is executed. Then, after the distribution package including the other necessary information is generated (S15), the signature for authenticating the data of the package is attached (S16).

In the present embodiment, the update data and the rollback data are not included in the individual vehicle package and the general-purpose package. The update data and the rollback data may have a file size of about several gigabytes. Since these data is not included in the individual vehicle package and the general-purpose package, the file size of the package can be significantly reduced. Since the individual vehicle package and the general-purpose package are generated as a compressed file, the processing load on the center device 3 can be reduced when the file size is small. That is, the package can be generated in shorter time by the center device 3 compared with a case where the package including the update data and the rollback data is generated.

Figure 11:
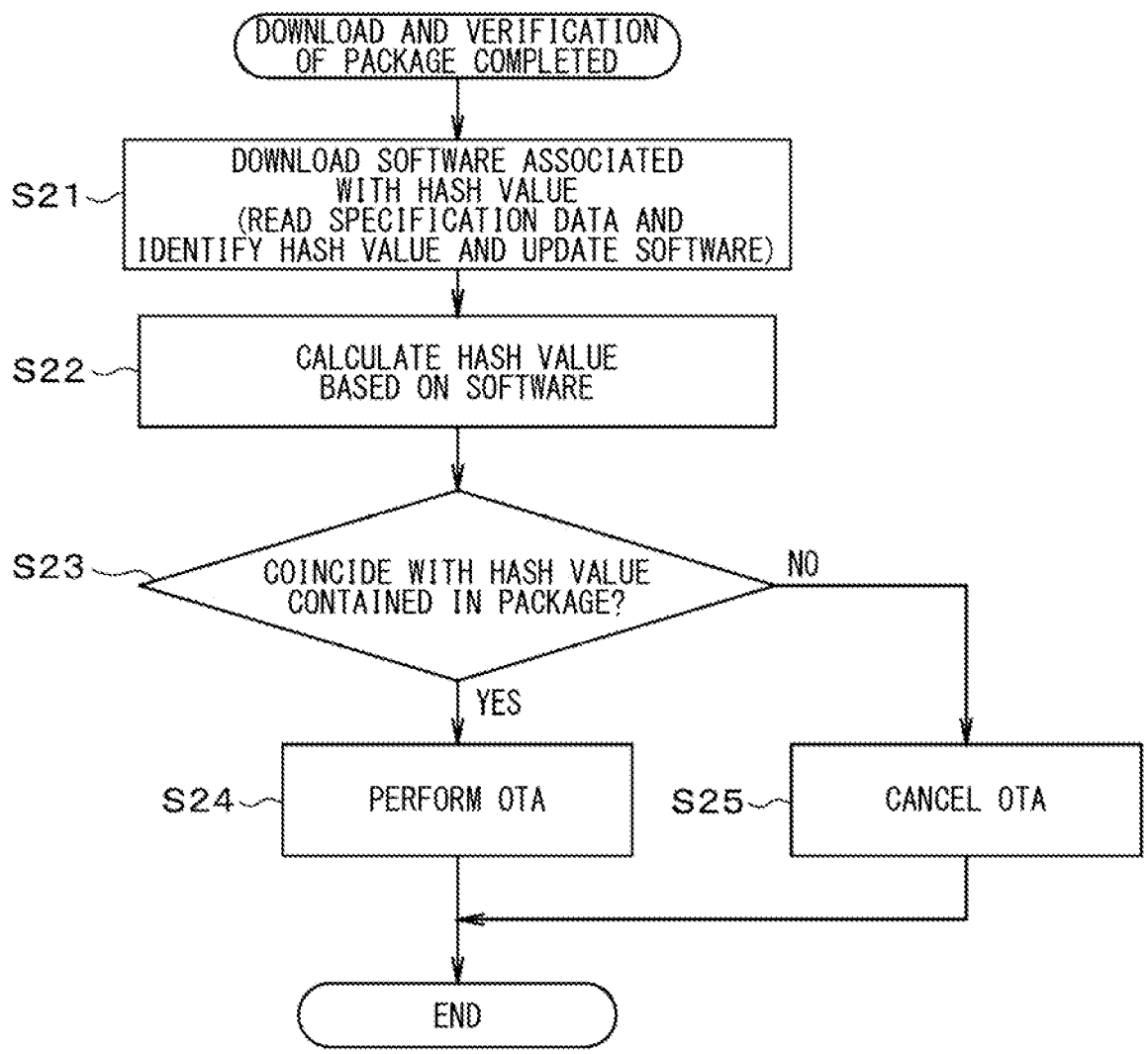
FIG. 11 is a flowchart showing a process of a vehicle system.

Next, the process by the vehicle system 4 that is the in-vehicle electronic control device will be described. As shown in FIG. 11, the vehicle system 4 downloads the distribution package addressed to the own vehicle and then downloads the difference data (S21). The "update software" in the drawings corresponds to the difference data. The vehicle system 4 may download the difference data having the file name included in the distribution package after the vehicle system 4 downloaded the distribution package for the own vehicle and completed the verification of the distribution package.

Subsequently, after the hash value of the downloaded difference data is calculated (S22), it is determined whether the calculated hash value matches the hash value included in the distribution package (S23). When the hash values match (YES), the OTA is executed, that is, the downloaded difference data is installed and activated (S24). In contrast, when the hash values do not match (NO), the OTA is cancelled (S25).

According to the present embodiment, in the configuration information DB 208, the identification information of each of the ECUs 19 and the information regarding the software architecture of each of the ECUs 19 are stored together with the vehicle type. The specification data generation unit 201 calculates the difference data that is the difference between the update data and the data before the update for each ECU 19 that is the update target. Further, the specification data generation unit 201 calculates the hash value of the difference data and stores the calculated hash value to the ECU reprograming data DB 204. When the package generation unit 202 generates the distribution package for the update target ECU 19, the package generation unit 202 generates the distribution package using the corresponding hash value stored in the ECU reprograming data DB 204.

That is, when the package generation unit 202 generates the distribution package for the update target ECU 19, the package generation unit 202 generates the distribution package containing the corresponding hash value stored in the ECU reprograming data DB 204. The package generation unit 202 generates the distribution package that does not include the update data file and the rollback data.

According to this configuration, since the package distributed to each vehicle includes the hash value of the difference data, the data size can be reduced, and accordingly, the processing time of the package can be reduced. In the vehicle that received the distribution package, it can be determine whether the difference data for updating the data corresponding to the own vehicle is genuine based on the hash value included in the specification data and the hash value calculated by the vehicle from the update data file.

Since the center device 3 manages the data using the association information in which the difference data and the distribution package including the hash value corresponding to the difference data are associated with each other, the difference data corresponding to the distribution package including the hash value can be easily identified.

The package generation unit 202 generates the distribution package including the hash values corresponding to the "ECU IDs" and the association information corresponding to the hash values. Accordingly, in the vehicle that received the distribution package, it can be easily determined whether multiple pieces of the difference data for updating the data corresponding to the own vehicle are genuine based on the hash value and the calculated hash value calculated from the difference data.

Further, since the package generation unit 202 generates the distribution package including the "VIN" that is the vehicle identification information, the destination of the package, that is, the vehicle that should receive the package can be identified based on the "VIN". Further, since the package generation unit 202 generates the distribution package including the signature used for authenticating the data in the distribution package, the security can be improved.

When the hash value is included in the distribution package received from the center device 3, the vehicle system 4 requests the center device 3 to download the difference data corresponding to the hash value. Accordingly, the difference data for updating the data corresponding to the own vehicle can be securely acquired based on the hash value.

Further, when the vehicle system 4 downloaded the difference data, the vehicle system 4 verifies the validity of the difference data by comparing the hash value with the calculated hash value calculated from the difference data. Accordingly, the validity of the difference data downloaded from the center device 3 can be verified using the hash value contained in the distribution package.

Other Embodiments

Although the present disclosure has been fully described in connection with the preferred embodiment thereof with reference to the accompanying drawings, it is to be noted that various changes and modifications will become apparent to those skilled in the art.

The "VIN" that is the vehicle identification information may be included in the distribution package as necessary. The signature for the distribution package may be attached as necessary. When the OTA is canceled in step S25, the center device 3 may be requested to download again. While the present disclosure has been described in accordance with the embodiment, it is understood that the present disclosure is not limited to such embodiments or structures. The present disclosure encompasses various modifications and variations within the scope of equivalents. Furthermore, various combinations and modes, and other combination and modes including only one, more or less element, fall within the spirit and scope of the present disclosure.

The controller and the method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. Further, the computer program may store a computer-readable non-transitional tangible recording medium as an instruction to be executed by the computer.

Additional advantages and modifications will readily occur to those skilled in the art. The disclosure in its broader terms is therefore not limited to the specific details, representative apparatus, and illustrative examples shown and described.

What is claimed is:

1. A center device configured to manage data written to a plurality of electronic control devices mounted in a vehicle, the center device comprising:
   a vehicle information storage unit that stores identification information for each of the plurality of electronic control devices and information of software architecture of the each of the plurality of electronic control devices together with a type of the vehicle;
   a hash value generation unit configured to, for the each of the plurality of electronic control devices that is an update target,
      generate difference data that is a difference between update data and the data before being updated,
      calculate a hash value of the difference data, and store the calculated hash value in a hash value storage unit;
a package generation unit configured to generate distribution package for the update target using corresponding hash value stored in the hash value storage unit; and
a distribution unit configured to transmit the distribution package to the vehicle in which the plurality of electronic control devices are mounted, wherein
the package generation unit is configured to generate the distribution package that contains the hash value and does not contain the difference data, and
the distribution unit is configured to transmit the distribution package and the difference data separately.

2. The center device according to claim 1, wherein the data is managed using association information that associates the difference data with the distribution package containing the hash value corresponding to the difference data.

3. The center device according to claim 2, wherein the package generation unit is configured to generate the distribution package containing a plurality of the hash values and a plurality of pieces of the association information each of which corresponds to each of the plurality of hash values.

4. The center device according to claim 1, wherein the package generation unit is configured to generate the distribution package containing identification information of the vehicle.

5. The center device according to claim 1, wherein the package generation unit is configured to generation the distribution package containing a signature for authenticating data of the distribution package.

6. The center device according to claim 1, wherein the distribution unit is configured to transmit the distribution package as a compressed file and the difference data as an uncompressed file.

7. An in-vehicle electronic control device configured to communicate with a center device configured to manage data written to a plurality of electronic control devices mounted in a vehicle, the center device comprising:
a vehicle information storage unit that stores identification information for each of the plurality of electronic control devices and information of software architecture of the each of the plurality of electronic control devices together with a type of the vehicle;
a hash value generation unit configured to, for the each of the plurality of electronic control devices that is an update target,
generate difference data that is a difference between update data and the data before being updated,
calculate a hash value of the difference data, and
store the calculated hash value in a hash value storage unit;
a package generation unit configured to generate distribution package for the update target using corresponding hash value stored in the hash value storage unit; and
a distribution unit configured to transmit the distribution package to the vehicle in which the plurality of electronic control devices are mounted;
wherein:
the package generation unit is configured to generate the distribution package that contains the hash value and does not contain the difference data, and
the distribution unit is configured to transmit the distribution package and the difference data separately
the in-vehicle electronic control device comprises at least one processor configured to request the center device to download the difference data corresponding to the hash value when the distribution package received by the in-vehicle electronic control device contains the hash value.

8. The in-vehicle electronic control device according to claim 7, wherein
the at least one processor is configured to, after the difference data is downloaded,
calculate a hash value of the downloaded difference data, and
verify a validity of the difference data by comparing the hash value contained in the distribution data with the calculated hash value.

9. A center device configured to manage data written to a plurality of electronic control devices mounted in a vehicle, the center device comprising:
a vehicle information storage unit that stores identification information for each of the plurality of electronic control devices and information of software architecture of the each of the plurality of electronic control devices together with a type of the vehicle; and
at least one processor configured to, for the each of the plurality of electronic control devices that is an update target,
generate difference data that is a difference between update data and the data before being updated,
calculate a hash value of the difference data, and
store the calculated hash value in a hash value storage unit, wherein:
the at least one processor is configured to:
generate distribution package for the update target using corresponding hash value stored in the hash value storage unit;
transmit the distribution package to the vehicle in which the plurality of electronic control devices are mounted;
generate the distribution package that contains the hash value and does not contain the difference data; and
transmit the distribution package and the difference data separately.

10. A center device configured to manage data written to a plurality of electronic control devices mounted in a vehicle, the center device comprising:
a vehicle information storage unit that stores identification information for each of the plurality of electronic control devices and information of software architecture of the each of the plurality of electronic control devices together with a type of the vehicle;
a hash value generation unit configured to, for the each of the plurality of electronic control devices that is an update target,
generate difference data that is a difference between update data and the data before being updated,
calculate a hash value of the difference data, and
store the calculated hash value in a hash value storage unit; and
a package generation unit configured to generate distribution package for the update target using corresponding hash value stored in the hash value storage unit,
wherein
the package generation unit is configured to generate the distribution package that contains the hash value and does not contain the difference data.

11. A center device configured to distribute to a vehicle data written to a plurality of electronic control devices mounted in the vehicle, the center device comprising:

a vehicle information storage unit that stores identification information for each of the plurality of electronic control devices and information of software architecture of the each of the plurality of electronic control devices together with a type of the vehicle;

a package acquisition unit configured to acquire a distribution package containing a hash value of a difference data that is a difference between update data and the data before being updated, for the each of the plurality of electronic control devices that is an update target, a distribution unit configured to transmit the distribution package to the vehicle in which the plurality of electronic control devices are mounted, wherein the package acquisition unit acquires the distribution package that contains the hash value and does not contain the difference data, and the distribution unit is configured to transmit the distribution package and the difference data separately.

* * * * *